United States Patent [19]

Tsuchiya et al.

[11] 3,715,285

[45] Feb. 6, 1973

[54] PROCESS OF ELECTRODEPOSITING MAGNETIC METAL LAYER ON ELECTRICALLY CONDUCTIVE SUBSTRATE

[75] Inventors: Noriyuki Tsuchiya; Katsutoshi Amari, both of Tokyo, Japan

[73] Assignee: Sony Corporation, Tokyo, Japan

[22] Filed: July 27, 1970

[21] Appl. No.: 58,594

[30] Foreign Application Priority Data

July 28, 1969 Japan ....................44/59486

[52] U.S. Cl. ....................204/12, 29/603, 161/213, 204/16

[51] Int. Cl. .........C23b 7/02, C23b 7/00, G11b 5/42

[58] Field of Search....................204/3–9, 16, 23–27; 29/603; 179/100.2 C

[56] References Cited

UNITED STATES PATENTS

| | | | |
|---|---|---|---|
| 2,792,340 | 5/1957 | James | 204/12 |
| 2,642,654 | 6/1953 | Ahrens | 204/16 |
| 3,061,525 | 10/1962 | Grazen | 204/16 |
| 3,498,890 | 3/1970 | Divecha et al | 204/16 |

FOREIGN PATENTS OR APPLICATIONS

| | | | |
|---|---|---|---|
| 860,290 | 2/1961 | Great Britain | 204/4 |

*Primary Examiner*—John H. Mack
*Assistant Examiner*—T. Tufariello
*Attorney*—Lewis H. Eslinger, Alvin Sinderbrand and Curtis, Morris and Safford

[57] ABSTRACT

A process of electrodepositing a magnetic metal layer on an electrically conductive substrate in an electrolytic cell containing one salt of the magnetic metal and a fine ferrite powder. The electrodeposited magnetic metal layer formed on the substrate of the cathode contains a fine ferrite powder dispersed therein.

7 Claims, 5 Drawing Figures

Figure 1:
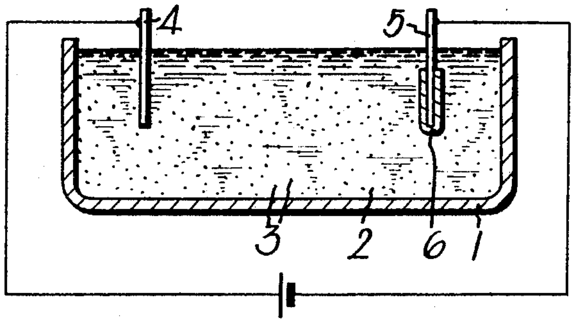
Figure 2:
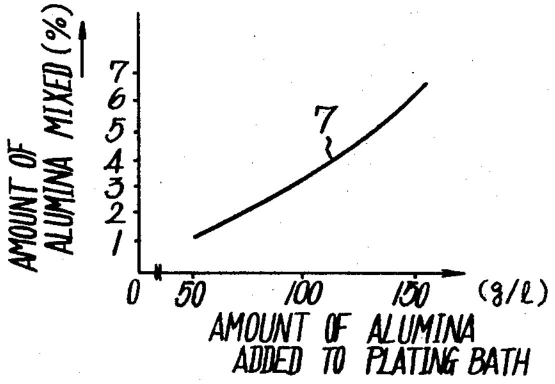
Figure 3:
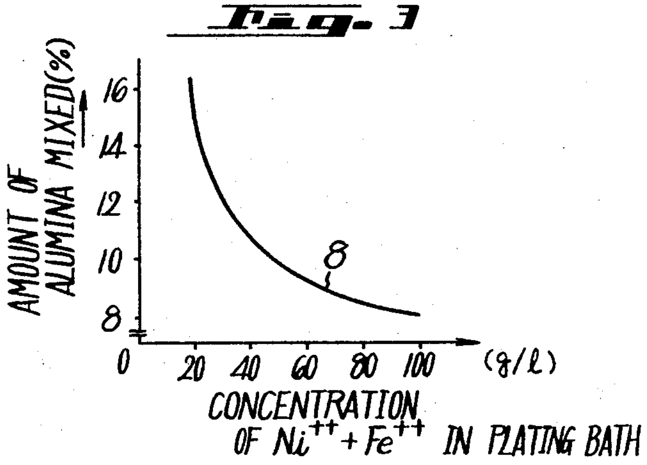
Figure 4:
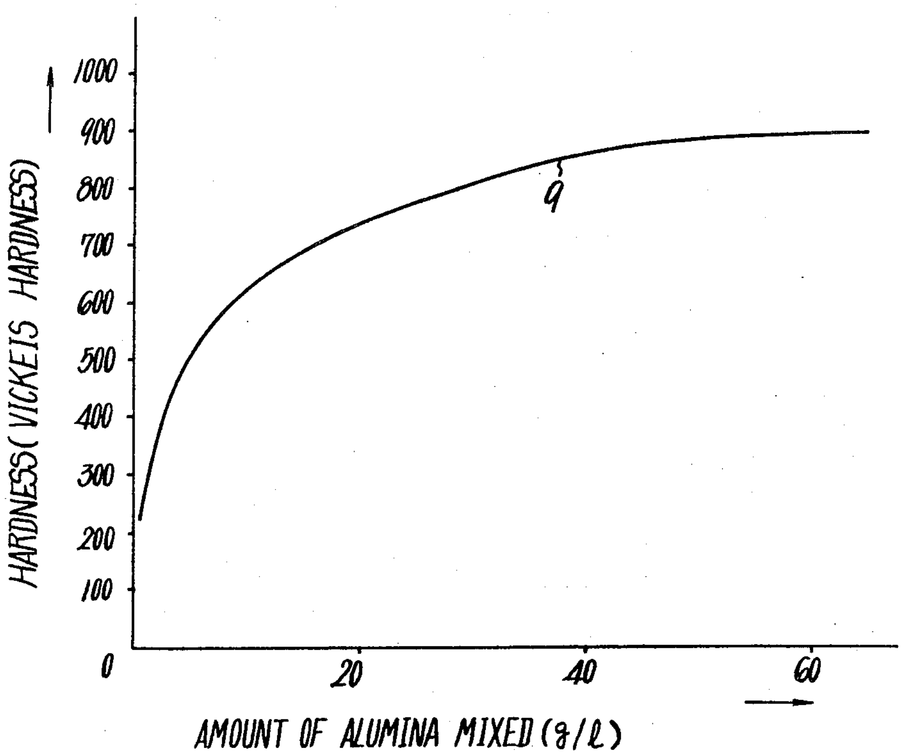

INVENTOR.
Noriyuki Tsuchiya
Katsutoshi Amari

INVENTOR.
Noriyuki Tsuchiya
Katsutoshi Amari

PROCESS OF ELECTRODEPOSITING MAGNETIC METAL LAYER ON ELECTRICALLY CONDUCTIVE SUBSTRATE

This invention relates to magnetic materials and to methods for forming magnetic materials and particularly to a process of electrodepositing magnetic layers and electrodeposited magnetic layers on electronically conductive substrates.

A conventional magnetic head for use in magnetic recording and reproducing apparatus is short-lived because the contact surface of the magnetic head with the magnetic tape is readily worn away. Because of this wear, the contact pressure of the magnetic head with the tape is decreased is as to increase dropout in its output and, as a result of this, the magnetic head does not perform its function properly. A tape contact surface of low hardness is readily scratched by a magnetic powder of the magnetic tape or dust adhering to the tape, thereby making impossible fine recording and reproducing.

With a magnetic head made of a high permeability material of great hardness such, for example, sintered ferrite or monocrystalline ferrite, no wear resistance problem will arise, but these ferrites are brittle and the gap portion of the head is likely to be broken off. It has also been proposed to use a laminated head core formed of a magnetic metal such as Sendust (trademark), Alfer or the like made in the shape of plates so as to prevent eddy current. In this case, the hardness and wear resistance of the head do not offer any problem, but it is very difficult to mold the material in a thin sheet metal form. From the viewpoint of workability, an iron-nickel alloy (having a Vickers hardness of 240 to 300) is the best for the material of the laminated head core, but this alloy is soft or not very hard, and hence has poor wear resistance.

It has been found that a magnetic layer electrodeposited in an electrolyte having dispersed therein, a fine powder of great hardness and one salt of a magnetic metal has excellent wear resistance and is by no means inferior in its magnetic characteristics to conventional magnetic heads. It is considered that this magnetic layer exhibits a high degree of wear resistance because the fine powder is widely dispersed in the deposited magnetic metal.

Further, it has been found that not only the wear resistance, but also the magnetic characteristics of the magnetic head can be enhanced by the use of a fine powder such as ferrite, Sendust alloy or the like; these powders have 1. magnetic properties; 2. great hardness and 3. insolubility in an electrolyte; and 4. is not attacked by the electrolyte.

In the making of a magnetic head according to this invention, a metal such as stainless steel or the like, which permits the film electrodeposited thereon to be easily stripped therefrom, can be used as the cathode, and the magnetic metal film stripped from such cathode can be laminated to produce the magnetic head. through permits the film electrodeposited thereon to easily come off therefrom, can be used as the cathode, the magnetic metal film can be laminated to produce the magnetic Further, the present invention is applicable to the making of a magnetic tape. That is, a conductive layer is formed by evaporation, non-electrolytic plating or the like on one surface of an insulating tape as of Mylar (trademark) and is then covered with the magnetic metal layer of this invention to provide magnetic tape.

Accordingly, the primary object of this invention is to provide a process of electrodepositing a magnetic metal film of great wear resistance. Another object is to provide a magnetic head for use in magnetic recorders and which is formed of electrodeposited magnetic metal film of great wear resistance.

A further object is to provide a magnetic recording medium whose surface layer has improved mechanical characteristics.

FIG. 1 is a schematic diagram showing a device for plating a magnetic metal film according to this invention; and FIGS. 2, 3, 4 and 5 are graphs respectively showing the experimental results of this invention.

In FIG. 1 there is shown a plating vessel which contains a suitable amount of a plating bath 2 of a metal of high permeability. The bath composition of the plating bath 2 is as follows:

Example I

| | |
|---|---|
| Iron-nickel system alloy plating bath. | |
| Nickel sulfamate, $Ni^{++}$ | 86.5 g/l |
| Ferrous sulfate | 20–25 g/l |
| Boric acid | 30 g/l |
| Hydroxylamine hydrochloride | 2–6 g/l |
| Saccharine sodium | 0.6–1 g/l |
| Sodium lauryl sulfate | 0–0.05 g/l |
| Sulfamic acid | 10–20 g/l |

Example II

| | |
|---|---|
| Iron-nickel system alloy plating bath | |
| Nickel sulfate | 140 g/l |
| Ferrous sulfate | 6–10 g/l |
| Boric acid | 15 g/l |
| Ammonium chloride | 15–16 g/l |
| Saccharine sodium | 5 g/l |

Example III

| | |
|---|---|
| Iron-nickel-molybdenum system alloy plating bath. | |
| Nickel sulfate | 218 g/l |
| Ferrous sulfate | 3–8 g/l |
| Sodium molybdate | 5 g/l |
| Boric acid | 25 g/l |
| Sodium lauryl sulfate | 0.2 g/l |

Example IV

| | |
|---|---|
| Iron-nickel-cobalt system alloy plating bath. | |
| Nickel sulfate | 140 g/l |
| Ferrous sulfate | 6–10 g/l |
| Boric acid | 25 g/l |
| Cobalt chloride | 5 g/l |

Example V

| | |
|---|---|
| Iron-nickel-manganese system alloy plating bath. | |
| Nickel sulfate | 150 g/l |
| Ferrous sulfate | 30 g/l |
| Sodium manganate | 5 g/l |
| Ammonium chloride | 15–16 g/l |

In FIG. 1 reference numeral 3 indicates, a fine powder contained in the plating bath 2 and having a diameter of less than 1 micron and insoluble in the plating bath 2. An anode, 4 formed of, for example, carbon and a cathode 5 formed of, for example stainless steel. The stainless steel cathode permits an electrodeposited layer formed thereon to easily removed therefrom. The fine powder 3, which is selected from, for example, alumina, kaolin, powdered glass, pulverized glass, talc, barium sulfate, strontium carbonate, titanium oxide, zirconium oxide powders, is mixed in the plating bath 2 in the amount of 25 to 400 grams per one liter of the plating bath 2. In our experiment a current was applied between the cathode 4 and the anode 5 while agitating the plating bath 2 to disperse the fine powder 3 uniformly therein. The high-permeability metal in the plating bath 2 was electrodeposited on the cathode 5 with the fine powder 3 being dispersed in the electrodeposit, providing a metal foil 6 about 20 to 50 microns thick.

Such a metal foil 6 is severed in thin sheets of a predetermined shape which are assembled into a laminated head core through the use of an adhesive binder. In our experiments using the aforementioned plating baths 2 and fine powder 3, the hardness of the metal foil 6 was more than 1.5 times as high as that of a metal foil formed only by electrodeposition of a high-permeability metal without dispersing the fine powder 3 in the plating bath, and the wear resistance of the laminated head core is several times that of conventional ones. Especially, the wear resistance of the magnetic head is greatly enhanced by dispersing in the plating bath a fine powder of, for example, talc of a low coefficient of friction. Further, the inherent resistance of the laminated head core according to this invention is several times as high as that of the conventional one, and the eddy current loss is remarkedly improved.

A description will be given of results of our experiments using the aforementioned sulfamic acid bath (I) as the plating bath 2 and alumina as the fine powder 3. The relationship of the amount of alumina mixed in the magnetic metal layer to the amount of alumina fine powder added to the plating bath 2 is as indicated by a curve 7 in FIG. 2. While, the relationship of the amount of alumina mixed in the resulting layer to the concentration of $Ni^{++}$ and $Fe^{++}$ in the plating bath 2 is as indicated by a curve 8 in FIG. 3. The hardness of the high-permeability metal foil 6, produced by using the plating bath having the alumina fine powder dispersed therein, relative to the amount of alumina mixed in the magnetic metal layer is as indicated by a curve 9 in FIG. 4. With alumina being added to the plating bath 2 in an amount of, for example, 100g per one liter of the bath, the amount of alumina mixed in the resulting magnetic metal layer is about 4 percent, namely approximately 4g per one liter of the bath and the hardness of the resulting metal foil 6 is about 520 to 530 (Vickers harness). With the amount of alumina mixed in the foil exceeding 40g per one liter of the plating bath, the hardness of the resulting metal foil is as high as 800 to 900 (Vickers hardness), but the metal foil is brittle. By the way, the hardness of a metal foil electrodeposited in the sulfamic acid plating bath (I) with no alumina mixed therein is approximately 200 (Vickers hardness), which is appreciably lower than that of the metal foil produced with the plating bath having mixed therein alumina. Further, the hardness of a metal foil obtained by the use of the sulfamic acid plating bath (I) having mixed therein nickel chloride is as high as about 560 (Vickers hardness), but the addition of nickel chloride introduces a disadvantage in that the crystal of the resulting metal is greatly distorted to cause the metal to be readily deformed.

Since a metal oxide such as alumina has good adhesion to an adhesive binder, a laminated head core made of a metal foil having such a metal oxide dispersed therein in the form of fine powder is of great mechanical strength.

In the foregoing, the fine powder is a non-magnetic one, so that the wear resistance of the magnetic head is appreciably improved, but its magnetic characteristics are a sacrificed somewhat. The use of a magnetic powder of great hardness as the fine powder, leads to enhancement of the wear-resistance of the magnetic head, and suitable selection of the magnetic powder enables the magnetic characteristics of the electrodeposited layer or film, (for example, the permeability ($\mu$), the coercive force ($Hc$), the residual induction ($Br$), the rectangular ratio ($Br/Bs$) and so on) to be at desired values.

The plating bath in this case may be of the following bath compositions but they are nickel-iron alloy plating baths.

Example VI

| | |
|---|---|
| Nickel sulfamate | 400 g/l |
| Ferrous chloride | 20 g/l |
| Hydroxylamine hydrochloride | 6 g/l |
| Boric acid | 35 g/l |
| Sodium lauryl sulfate | 1 g/l |

Example VII

| | |
|---|---|
| Nickel sulfamate | 470 g/l |
| Ferrous sulfate | 40 g/l |
| Hydroxylamine phosphate | 6 g/l |
| Sodium ascorbate | 5 g/l |
| Sodium lauryl sulfate | 1 g/l |
| Cyquest (trademark, dispersing agent) | 0.1 g/l |
| FX-161 (trademark, surface-active agent) | 6 g/l |

Example VIII

| | |
|---|---|
| Nickel sulfamate | 400 g/l |
| Ferric chloride | 42 g/l |
| Ammonium chloride | 20 g/l |
| | (pH;3.0) |

Example IX

| | |
|---|---|
| Nickel sulfamate | 473 g/l |
| Boric acid | 30 g/l |
| Ferrous sulfate | 20–25 g/l |
| Hydroxylamine sulfate | 2–6 g/l |
| Sodium lauryl sulfate | 0.05–1 g/l |
| | (pH:1.0) |

Example X

| | |
|---|---|
| Nickel sulfamate | 470 g/l |
| $FeCl_2$ | 25 g/l |
| Boric acid | 30 g/l |
| Sulfamic acid | pH modifier |
| Ascorbic acid | 5 g/l |
| Sodium lauryl sulfate | 0.01 g/l |
| Dispersing agent | 0.05 g/l |

Any of these plating baths is used and a ferrite powder, for example, a $ZnMn(FeO_4)_2$ powder having a grain size of about 10 microns is mixed in the plating bath in an amount of 100g per one liter of the bath 2, and the plating bath 2 is well agitated so as to disperse the ferrite powder uniformly in the plating bath 2. Under such conditions, the anode 4 is made of carbon, and the cathode 5 of stainless steel 5. They are immersed in the plating bath 2 as previously described, and then a current is applied between the electrodes 4 and 5. In this case, a magnetic alloy, that is, permalloy (Fe-Ni alloy) is electrodeposited on the surface of the cathode 4 in the form of a magnetic metal foil 6 about 20 to 50 microns thick. The metal foil 6 thus obtained, is formed as a magnetic material that the magnetic powder, in this example ferrite, has been dispersed in the magnetic alloy (permalloy in this example).

The magnetic metal foil 6 thus electrodeposited, is removed from the cathode 5, and severed in sheets of a predetermined shape (or plating resist may be deposited in advance on the cathode 5 in desired form), and the sheets are laid on top of another, and assembled by an adhesive binder to provide, for example, a laminated magnetic head core.

The magnetic head thus produced is free from breakage at its air gap portion, which often occurs in the permalloy head, and the magnetic head is low in sensitivity loss. Further, this magnetic head exhibits a high degree of wear resistance comparable to that of ferrite (0.6mm/10,000 hours). Further, it has been found that its initial permeability $\mu_0$, residual magnetic induction or remanence Br, saturaled magnetic flux density B*s*, and coercive force Hc are respectively 7,000 to 8,000, 3,500 to 4,000 gauses, 4,000 to 6,000 gauses and 0.05 oersteds. By the way, the initial permeability $\mu_0$, residual magnetic induction or remanence Br, saturated magnetic flux density Bs and coercive force Hc of the ferrite ($ZnMn(Fe_4)_2$) are respectively 8,000 to 4,000, 800 to 2,000 gauses, 3,000 to 4,500 gauses and 0.01 to 0.05 oersteds.

As will be seen from the above, the wear resistance of the magnetic alloy produced by the electrodeposition method of this invention is well comparable to that of the ferrite. In addition, it has been ascertained that its magnetic characteristics such, for example, as the initial permeability $\mu_0$ and so on, are almost equal to those of the ferrite.

Figure 5:
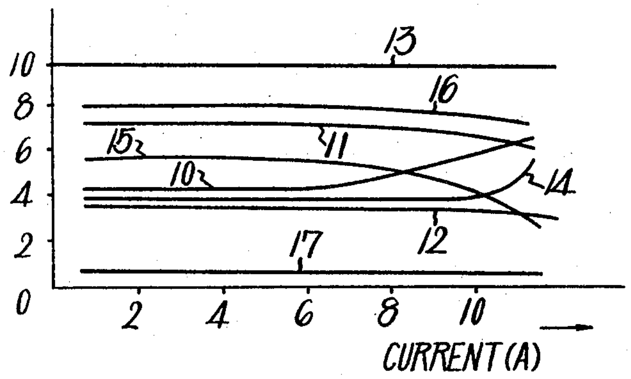

FIG. 5 is a graph showing the magnetic characteristics of an electrodeposited magnetic material (hereinafter referred to as a specimen A), produced with the plating bath having the bath composition of the Example X, and having dispersed therein an alumina powder about 10 microns in diameter in an amount of 100g per one liter of the bath, so as to increase the hardness of the resulting magnetic material, and the magnetic characteristics of an electrodeposited magnetic material (hereinafter referred to as a specimen B), produced with the plating bath of the Example X employing a magnetic powder. The abscissa represents an electrodeposition current I. In this case, the temperature of the plating bath is 40° C.

In the figure, curves 10, 11, 12 and 13 respectively indicate the residual magnetic induction or remanence B*r*, the saturated magnetic flux density Bs, the initial permeability $\mu_0$ and the coercive force Hc of the specimen A, while curves 14, 15, 16 and 17 respectively indicate those of the specimen B. In this graph the ordinate represents the residual magnetic induction or remanence Br (indicated by the curves 10 and 14) on the order of $10^3$, the saturated magnetic flux density B*s* (by the curves 11 and 15) on the order of $10^3$, the initial permeability $\mu_0$ (by the curves 12 and 16) on the order of $10^{-1}$ respectively. Their units are respectively different, of course.

In the above example, the ferrite powder is mixed in the permalloy plating bath, but the magnetic powder need not be limited specifically to the ferrite one, and other magnetic powder of desired magnetic characteristics can be employed.

Such magnetic powders usable are Sendust, Alfer, Supermalloy and so on. The mechanical and magnetic characteristics of these magnetic materials are as shown in the following Table 1. Accordingly, the characteristics of the electrodeposited magnetic materials produced by this invention method using such magnetic powders are approximate to those indicated below.

Table 1

| Magnetic powder | Wear | Hardness (Vickers hardness) | $\mu_0$ | Bs gauss | Br gauss | Hc oersted |
|---|---|---|---|---|---|---|
| Sendust 5Al:10Si | 0.5/1,000 hrs | 550–580 | 50,000 | 8,500 | 3,260 | 0.018 |
| Alfer 13Al | | less than 400 | 600-4,100 | 12,000 | 10,000 | 0.66 |
| Supermalloy 5Mo:79Ni | 0.4-1.01 1,000 hrs | 300–350 | 100,000 | 7,900 | 7,000 | 0.002 |

Although the present invention has been described as being applied to the making of an electrodeposited magnetic material of high-permeability, the invention is similarly applicable to the production of a ferromagnetic material for use in a magnetic recording medium. In this case, a nickel-cobalt alloy plating bath can be sued. In our experiment employing such a nickel-cobalt alloy plating bath of the following bath composition;

| | |
|---|---|
| Cobalt chloride | 72 g/l |
| Nickel chloride | 48 g/l |
| Saccharine | 9 g/l |

an iron oxalate-cobalt alloy oxide was dispersed in the bath in an amount of 50 to 200g per one liter of the latter. In this case the coercive force H*c*, the residual magnetic induction or remanence Br and the ratio of B*r* to B*s* of the resulting magnetic material were respectively 300 to 600, 2,000 to 600 and 0.6 to 0.8.

By the way, the coercive force Hc, the residual magnetic induction or remanence Br, and the ratio of B*r* to B*s* of an electrodeposited layer of the nickel-cobalt alloy with no iron oxalate-cobalt alloy oxide therein are respectively 400 to 800, 2,000 to 12,000 and 0.3 to 0.6.

As will be seen from this, the ratio of B*r* to B*s* can be greatly raised. Further, the magnetic powder need not be limited specifically to the above one but may be selected according to magnetic characteristics desired to be obtained. For example, chromium oxide may be added to the plating bath in an amount of 50 to 200g per one liter of the latter.

The electrodeposited magnetic material obtained by this invention method can be made to have desired magnetic and mechanical characteristics by selecting the fine powder to be added to the plating bath, as has been described in the foregoing. Thus, this invention is very advantageous in practical use.

It will be apparent that many modifications and variations may be effected without departing from the scope of the novel concepts of this invention.

We claim as our invention

1. A process of manufacturing a core for a magnetic recording and/or reproducing head comprising the steps of forming an electrolyte having at least one salt of a magnetic metal of high permeability; dispensing in said electrolyte a fine powder of a high permeability material which is insoluble in said electrolyte and which has a hardness greater than that of said magnetic metal; immersing an anode and a cathode of stainless steel in said electrolyte; passing a current from said anode to said cathode in said electrolyte, whereby there is formed on said stainless steel cathode a strippable, high permeability, magnetic film of said metal with said relatively hard fine powder therein, stripping said film from said cathode, dividing said film into a plurality of lamellae, and securing together said lamellae to form a laminated magnetic head core.

2. The process as claimed in claim 1 wherein the fine powder is a ferrite powder.

3. The process as claimed in claim 1 wherein the magnetic metal layer is an iron-nickel alloy.

4. The process as claimed in claim 1 wherein the magnetic metal layer is an iron-nickel-molybdenum alloy.

5. The process as claimed in claim 1 wherein the magnetic metal layer is an iron-nickel-cobalt alloy.

6. The process as claimed in claim 1 wherein the magnetic metal layer is an iron-nickel-manganese alloy.

7. The process as claimed in claim 1 wherein the magnetic metal layer is a nickel-cobalt alloy.

* * * * *